(12) United States Patent
Kim et al.

(10) Patent No.: US 6,249,601 B1
(45) Date of Patent: Jun. 19, 2001

(54) METHOD FOR DETERMINING COLOR OF ILLUMINANT AND APPARATUS THEREFOR

(75) Inventors: Jeong-yeop Kim; Seong-deok Lee, both of Suwon; Chang-yeong Kim, Uiwang; Yang-seok Seo, Seoul, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/245,066

(22) Filed: Feb. 5, 1999

(30) Foreign Application Priority Data

Dec. 4, 1998 (KR) .................................................. 98-53119

(51) Int. Cl.$^7$ ....................................................... G06K 9/00
(52) U.S. Cl. ................................................................ 382/162
(58) Field of Search .................................... 382/162, 167, 382/163; 358/520, 518, 521, 527

(56) References Cited

U.S. PATENT DOCUMENTS

| | | | |
|---|---|---|---|
| 4,685,071 | * 8/1987 | Lee | 355/38 |
| 4,992,963 | * 2/1991 | Funt et al. | 250/226 |
| 5,168,303 | * 12/1992 | Ikenoue et al. | 355/38 |
| 5,825,916 | * 10/1998 | Denber | 382/161 |
| 5,907,629 | * 5/1999 | Funt et al. | 382/162 |

* cited by examiner

Primary Examiner—Amelia M. Au
Assistant Examiner—Jingge Wu

(74) Attorney, Agent, or Firm—Burns, Doane, Swecker & Mathis, LLP

(57) ABSTRACT

A method for determining the color of an illuminant and an apparatus therefor are provided. The method for determining the color of the illuminant according to the present invention includes the steps of obtaining an RGB mean vector value by selecting an arbitrary image and calculating a mean value in each RGB channel with respect to the image, defining a predetermined coefficient f which is a positive integer larger than 1 and estimating a value obtained by multiplying f by the RGB mean vector value as temporary color of the illuminant with respect to the selected image, estimating the illuminant color closest to the temporarily estimated illuminant color temperature on the day light locus as an illuminant color temperature, setting a value obtained by multiplying k by the estimated color of the illuminant as a self luminous threshold value in order to establish a self luminous area using a human visual characteristic wherein k is a predetermined coefficient which is a positive integer larger than 1, generating an image from which the self luminous threshold value is removed by removing the self luminous area having the RGB value exceeding the self luminous threshold value, and calculating the color of an illuminant from the uv chrominance value of the image from which the self luminous area is removed and outputting the illuminant color. It is possible to stably and effectively extract information of an illuminant by selectively excluding a self luminous area from a visually sensed image in the method for detecting the illuminant color according to the present invention.

19 Claims, 8 Drawing Sheets

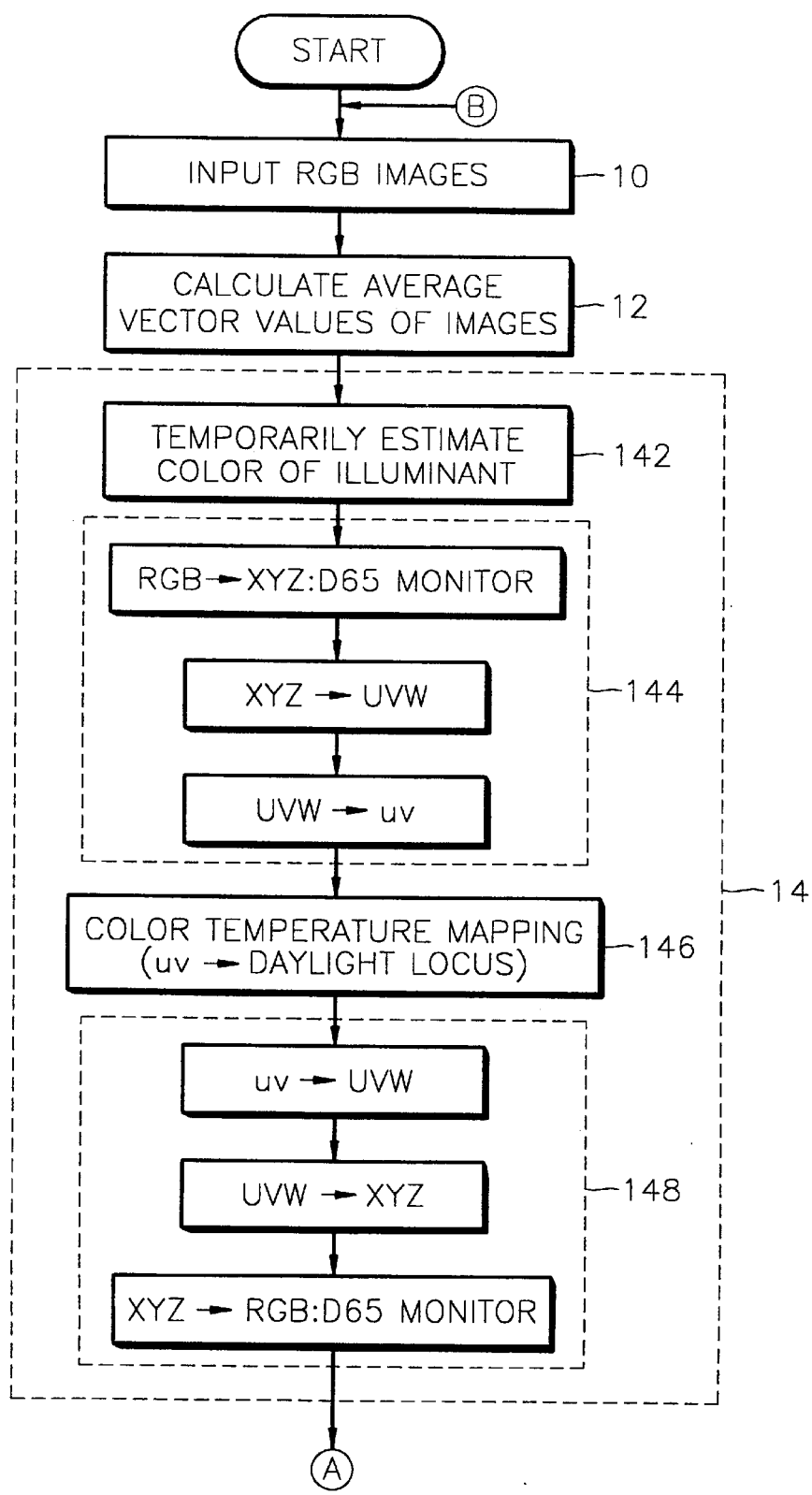

METHOD FOR DETERMINING COLOR OF ILLUMINANT AND APPARATUS THEREFOR

This application claims priority under 35 U.S.C. §§119 and/or 365 to 98-53119 filed in Korea on Dec. 4, 1998; the entire content of which is hereby incorporated by reference.

BACKGROUND OF THE INVENTION

1. Field of the Invention

The present invention relates to a method for determining the color of an illuminant and an apparatus therefor, and more particularly, to a method for determining the color of an illuminant by estimating the color of an illuminant of an input image and an apparatus therefor.

2. Description of the Related Art

Color correction is performed, considering the influence of illumination during photography in a color image inputting apparatus such as a digital camera. A white balancing function for performing color correction with respect to a channel ratio among R, G, and B channels is widely used as a representative example of color correction with respect to an illuminant Various methods for performing color correction such as white balancing have been developed. In the case of a video camera, chrominance information of an illuminant is generally obtained by photographing white paper or a white board before photography and white balancing is performed with reference to the chrominance information. Alternatively, controlling buttons corresponding to specific illuminations may be included and the button input by a user may be referred to. Alternatively, an illumination detector may be attached to a camera and information on the illumination may be obtained from a detected signal. Alternatively, the color of an illuminant may be obtained from a photographed image. However, the method of using the photo detector has problems in that the manufacturing costs increase since additional hardware is required for the camera and it is difficult to use for an image obtained by remote photography. Also, the method of using buttons has a problem in that many buttons are necessary in order to appropriately correspond to various illuminant components.

A method according to a conventional technology for solving the above problems is provided in U.S. Pat. No. 4,685,071. According to the above method, the color of a specularly reflected light is detected in a scene of an image so that the color of the light used to illuminate the scene is determined. According to this method, the color of the specularly reflected light is detected by detecting a surrounding area which includes highlight displaying varying hues and saturations on a plurality of differently colored surfaces in the scene. Also, according to the method, an image is transformed into a color signal of a chrominance coordinate in order to detect the change of a color which is independent of brightness and color boundaries on which saturation and color most severely change. Then, the color of the illuminant is detected using a data set around the boundary due to the change in saturation. In this case, in order to determine whether the boundary is due to the change in saturation or due to color, the data sets positioned on both sides of the boundary are collected and approximated to straight lines and variables determined to be colors of illuminants are collected from the paths of the intersection points of the straight lines.

However, in this method, it is not easy to collect data since the data sets are not approximated to the straight lines and further to this it is required that collection data on both sides of the boundary point, approximating the data to straight lines, and comparing and determining the data must be repeated. Therefore, such a method has disadvantage in that it takes an excessively long time to perform.

A method according to another conventional technology is provided in the U.S. Pat. No. 5,495,428. According to this method, the color of an illuminant is determined by grasping the color distribution using a histogram with respect to the entire image, obtaining a direct line which becomes a main axis in each cluster, and applying an appropriate scale factor to each direct line. While in this method it is relatively easy to secure data to be processed, it requires a large amount of calculation during the process of interpreting though.

SUMMARY OF THE INVENTION

To solve the above problem, it is an object of the present invention to provide a method for determining the color of an illuminant by which it is possible to extract stable and effective illuminant information by selectively excluding self luminous areas from an image which human visually perceives.

It is another object of the present invention to provide an apparatus for determining the color of an illuminant which utilizes the above method.

Accordingly, to achieve the first object, a method for detecting the color of an illuminant during photography of a color image having arbitrary standard color coordinates which can be transformed, comprising the steps of obtaining a mean vector value by selecting an arbitrary image and calculating an average value in each color coordinate channel with respect to the image, defining a predetermined coefficient f which is a positive integer larger than 1 and estimating a value obtained by multiplying f by the mean vector value as a temporary color of the illuminant with respect to the selected image, setting a value obtained by multiplying k by the temporarily estimated color of the illuminant as a self luminous threshold value in order to establish a self luminous area using human visual characteristics, wherein k is a predetermined coefficient which is a positive integer larger than 1, generating an image from which the self luminous area is removed by removing the self luminous area having a color coordinate value exceeding a self luminous threshold value, determining whether the difference value of the self luminous threshold value exceeds a predetermined reference value and returning to the step of calculating the mean vector value when the difference value is determined to exceed a predetermined reference value, and calculating the color of the illuminant from a chrominance value of an image average from which the self luminous area is removed and outputting the color of the illuminant when it is determined that the difference value does not exceed a predetermined reference value in the step of determining the difference value step.

In the above method, the coefficient k is determined by the steps of providing a plurality of color patches, selecting an illuminant which can be used in an image, illuminating the selected illuminant on the plurality of color patches, selecting an arbitrary patch among the plurality of color patches, increasing the RGB value of a corresponding packet until the selected patch looks like an illuminant, establishing the RGB value when the corresponding patch looks like the illuminant as an upper boundary, increasing the RGB value of the patch by a predetermined amount, reducing the RGB value of a corresponding packet until the selected patch looks like the illuminant, establishing the RGB value when the corresponding patch looks like the illuminant as a lower boundary, and determining a mean value between the upper boundary and the lower boundary as the variable k with respect to the selected illuminant.

Also, it is preferably that the above method further comprising a step of estimating illuminant color closest to the temporarily estimated illuminant color on a day light locus as the illuminant color before the step of setting the self luminous threshold value.

To achieve the first object, there is provided another method for detecting the color temperature of an illuminant during photography of an arbitrary color image, comprising the steps of obtaining an RGB mean vector value by selecting an arbitrary image and calculating a mean value in each RGB channel with respect to the image, defining a predetermined coefficient f which is a positive integer larger than 1 and estimating a value obtained by multiplying f by the RGB mean vector value as temporary color of the illuminant with respect to the selected image, setting a value obtained by multiplying k by the estimated color of the illuminant as a self luminous threshold value in order to establish a self luminous area using a human visual characteristic wherein k is a predetermined coefficient which is a positive integer larger than 1, generating an image from which the self luminous threshold value is removed by removing the self luminous area having the RGB value exceeding the self luminous threshold value, determining whether the difference value of the self luminous threshold value exceeds a predetermined reference value close to 0 and returning to the step of calculating the RGB mean vector value when the difference value is determined to exceed a predetermined reference value, and calculating the color of the illuminant from the chrominance value of the image average from which the self luminous are is removed and outputting the color of the illuminant when the difference value is determined not to exceed a predetermined reference value in the step of determining the difference value.

Also, to achieve the first object, there is provided still another method for detecting the color temperature of an illuminant during photography of an arbitrary color image, comprising the steps of obtaining an RGB mean vector value by selecting an arbitrary image and calculating a mean value in each RGB channel with respect to the image, defining a predetermined coefficient f which is a positive integer larger than 1 and estimating a value obtained by multiplying f by an RGB mean vector value as temporary illuminant color with respect to a selected image, transforming the temporary illuminant color from RGB coordinates into XYZ coordinates with respect to an output apparatus having a predetermined color temperature, transforming the illuminant color transformed into the XYZ coordinates into the UVW coordinates, normalizing the illuminant color transformed into the UVW coordinates to the uv chrominance coordinate value, selecting the uv chrominance coordinate value closest to the normalized on the day light locus as an estimated illuminant color, inverse transforming the estimated illuminant color expressed as the uv chrominance coordinate value to the UVW coordinates, inverse transforming the estimated illuminant color inverse transformed to the UVW coordinates to the XYZ coordinates, inverse transforming the estimated illuminant color inverse transformed to the XYZ coordinate from the XYZ coordinates to the RGB coordinates with respect to an output apparatus having the predetermined color, setting a value obtained by multiplying k by the estimated illuminant color inverse transformed to the RGB coordinates in order to establish a self luminous area according to a human visual characteristics wherein k is a predetermined coefficient which is a positive integer larger than 1, generating an image from which the self luminous area is removed by removing the self luminous area having an RGB value exceeding the self luminous threshold value from the selected area, determining whether the difference value of the self luminous threshold value exceeds a predetermined reference value close to 0 and returning to the step of calculating the RGB mean vector value when the difference value exceeds a predetermined reference value, and calculating the illuminant value corresponding to the uv chrominance value of the image from which the self luminous area is removed on the day light locus and outputting the illuminant color value when the difference value is determined not to exceed a predetermined reference value in the step of determining the difference value.

To achieve the second object, there is provided an apparatus for detecting the color of an illuminant during photography of a color image having arbitrary standard color coordinates which can be transformed, comprising an image average calculating portion for outputting a mean vector value by selecting an arbitrary image and calculating a mean value in each color coordinate channel, an illuminant color temporarily estimating portion for defining a predetermined coefficient f which is a positive integer larger than 1 and outputting a value obtained by multiplying f by the mean vector value as a temporarily estimated illuminant color with respect to the selected image, a self luminous threshold value setting portion for setting a value obtained by multiplying k by the temporarily estimated illuminant color as a self luminous threshold value in order to establish a self luminous area using a human visual characteristics wherein k is a predetermined coefficient which is a positive integer larger than 1, a self luminous area removing portion for generating an image from which the self luminous area is removed by removing the self luminous area having a color coordinate value exceeding the self luminous threshold value, and a color temperature calculating portion for calculating the illuminant color value from the chrominance value of the image average from which the self luminous area is removed.

To achieve the second object, there is provided another apparatus for determining the color of an illuminant during photography of an arbitrary color image, comprising an image mean calculating portion for outputting an RGB mean vector value by selecting an arbitrary image and calculating a mean value in each RGB channel with respect to the image, an illuminant color temporarily estimating portion for defining a predetermined coefficient f which is a positive integer larger than 1 and estimating a value obtained by multiplying f by the RGB mean vector value as a temporary illuminant color with respect to the selected image, a color temperature estimating portion for estimating the illuminant color closest to the temporarily estimated illuminant color temperature on the day light locus as an illuminant color temperature, a self luminous threshold value setting portion for setting a value obtained by multiplying k by the estimated illuminant color as the self luminous threshold value when a predetermined coefficient which is a positive integer larger than 1 is called k in order to establish a self luminous area using human visual characteristics, a self luminous area removing portion for generating an image from which a self luminous are is removed by removing the self luminous area having an RGB value exceeding the self luminous threshold value, and a color temperature calculating portion for calculating the color of an illuminant from the uv chrominance value of the image from which the self luminous area is removed and outputting the illuminant color.

To achieve the second object, there is provided still another apparatus for detecting an illuminant color temperature for detecting an illuminant temperature during photographing from an arbitrary color image, comprising means for obtaining an RGB mean vector value by selecting an arbitrary image and calculating a mean value in each RGB channel with respect to the image, means for defining a predetermined coefficient f which is a positive integer larger than 1 and estimating a value obtained by multiplying f by an RGB mean vector value as an temporary illuminant color with respect to a selected image, means for transforming the temporary illuminant color from RGB coordinates into XYZ coordinates with respect to an output apparatus having a predetermined color temperature, means for transforming the illuminant color transformed into the XYZ coordinates into the UVW coordinates, means for normalizing the illuminant color transformed into the UVW coordinates to the uv chrominance coordinate value, means for selecting the uv chrominance coordinate value closest to the normalized on the day light locus as an estimated illuminant color, means for inverse transforming the estimated illuminant color expressed as the uv chrominance coordinate value to the UVW coordinates, means for inverse transforming the estimated illuminant color inverse transformed to the UVW coordinates to the XYZ coordinates, means for inverse transforming the estimated illuminant color inverse transformed to the XYZ coordinate from the XYZ coordinates to the RGB coordinates with respect to an output apparatus having the predetermined color, means for setting a value obtained by multiplying k by the estimated illuminant color inverse transformed to the RGB coordinates in order to establish a self luminous area according to human visual characteristics wherein k is a predetermined coefficient which is a positive integer larger than 1, means for generating an image from which the self luminous area is removed by removing the self luminous area having the RGB value exceeding the self luminous threshold value from the selected area, and means for calculating an illuminant color temperature corresponding the uv chrominance value of the image from which the self luminous area is removed on the day light locus and outputting the illuminant color temperature.

BRIEF DESCRIPTION OF THE DRAWING(S)

The above objects and advantages of the present invention will become more apparent by describing in detail a preferred embodiment thereof with reference to the attached drawings in which.

Figure 4:
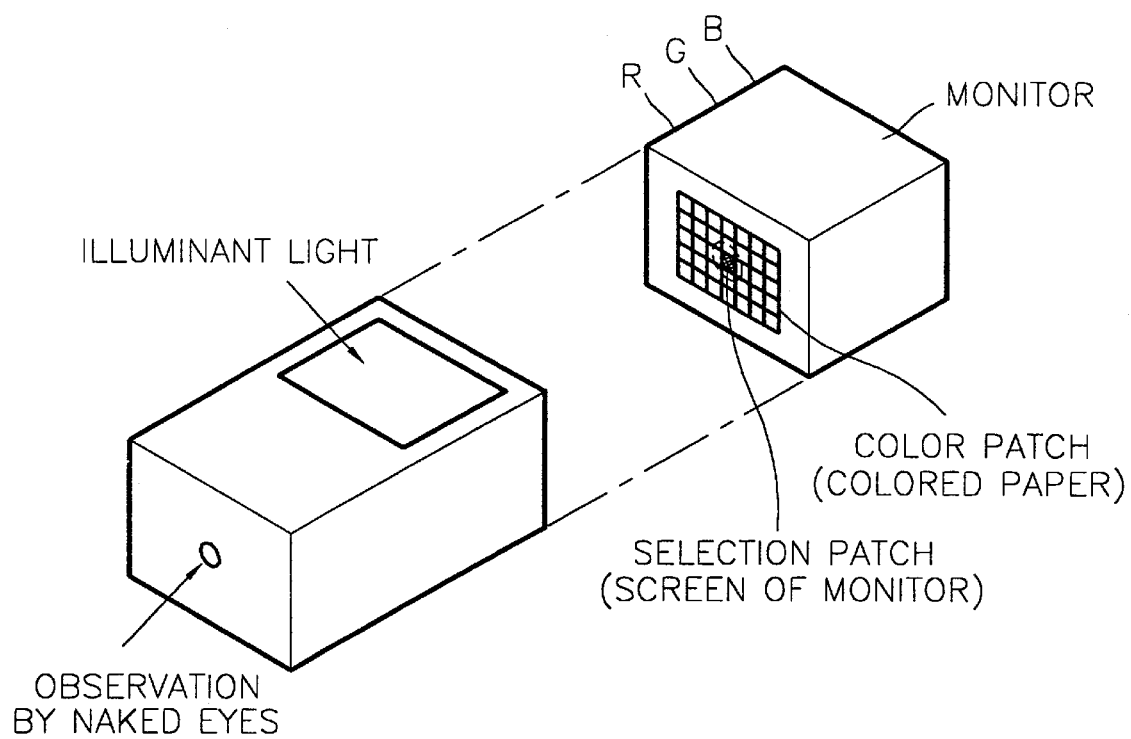
Figure 5A:
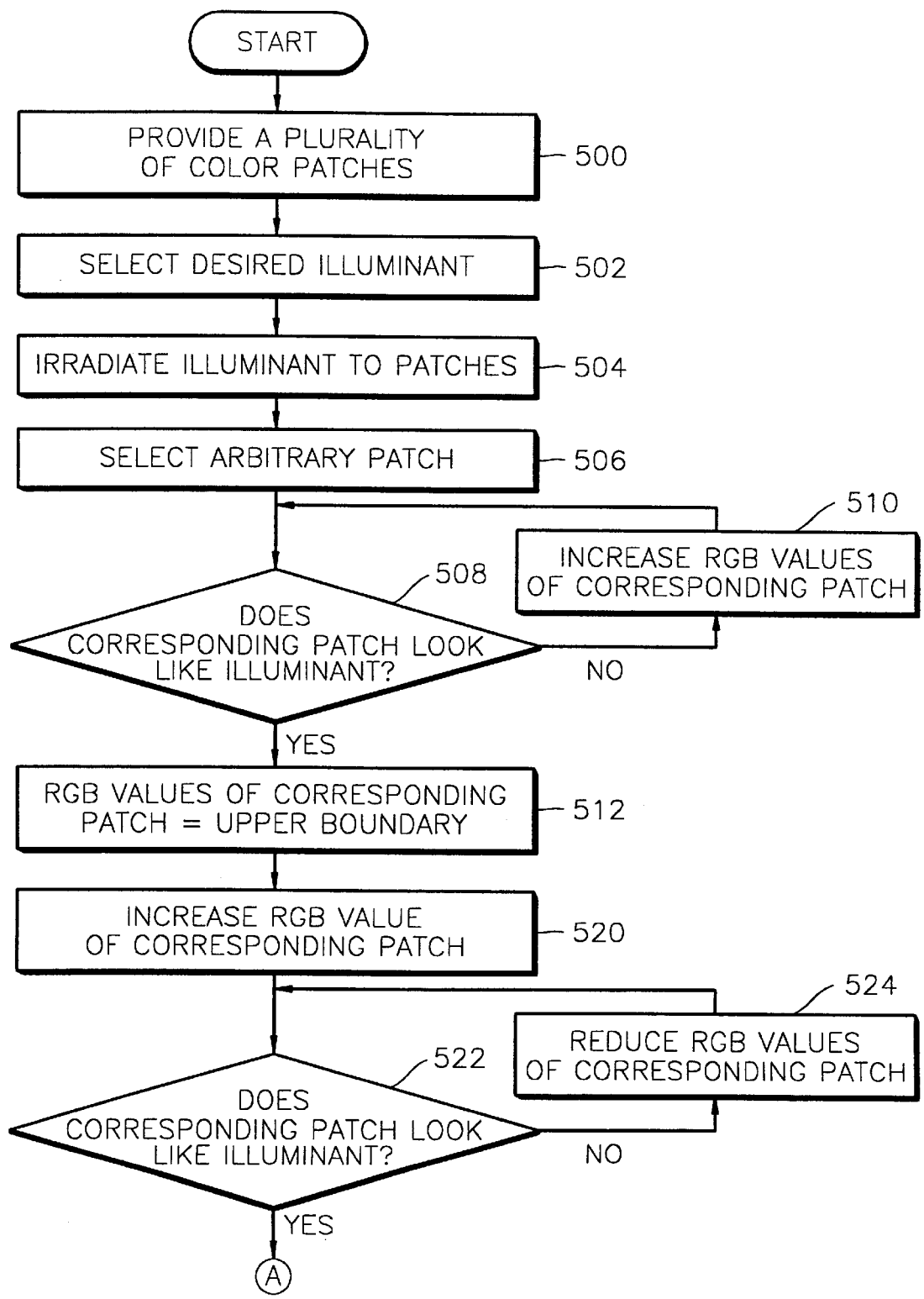
Figure 5B:
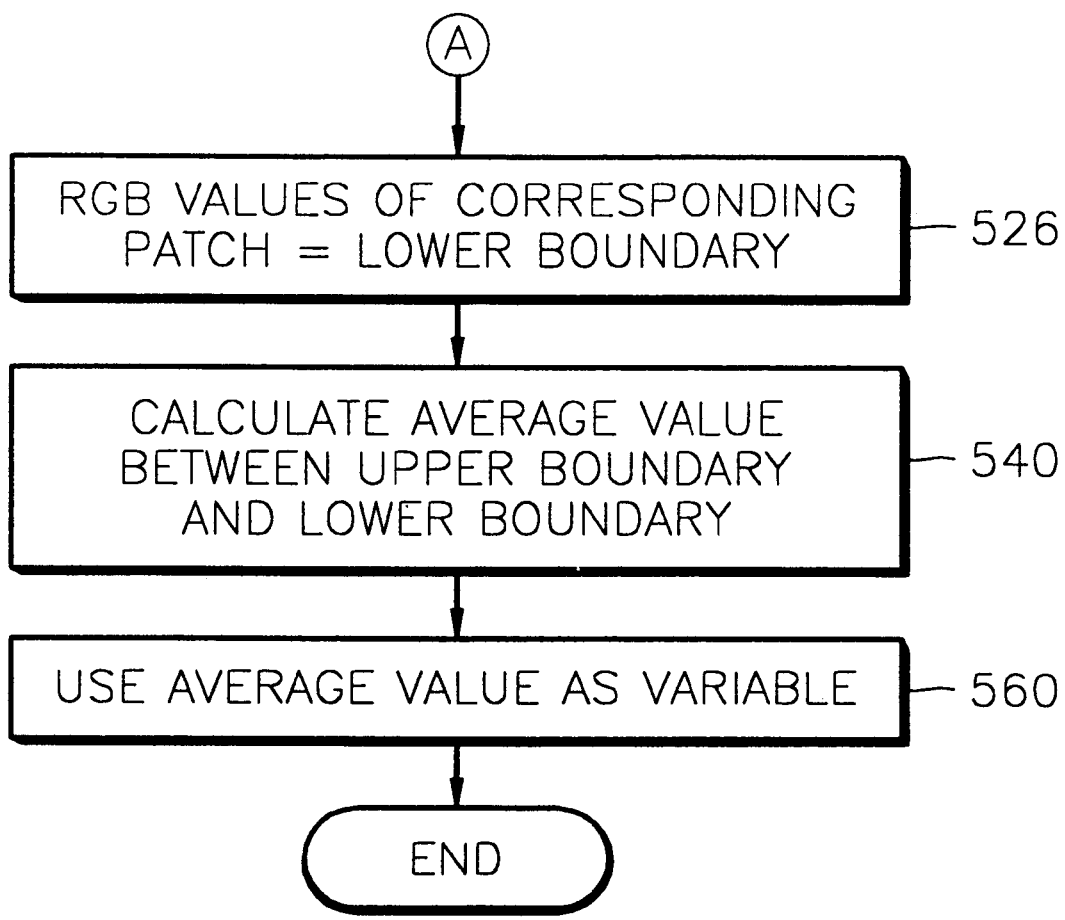
Figure 6:
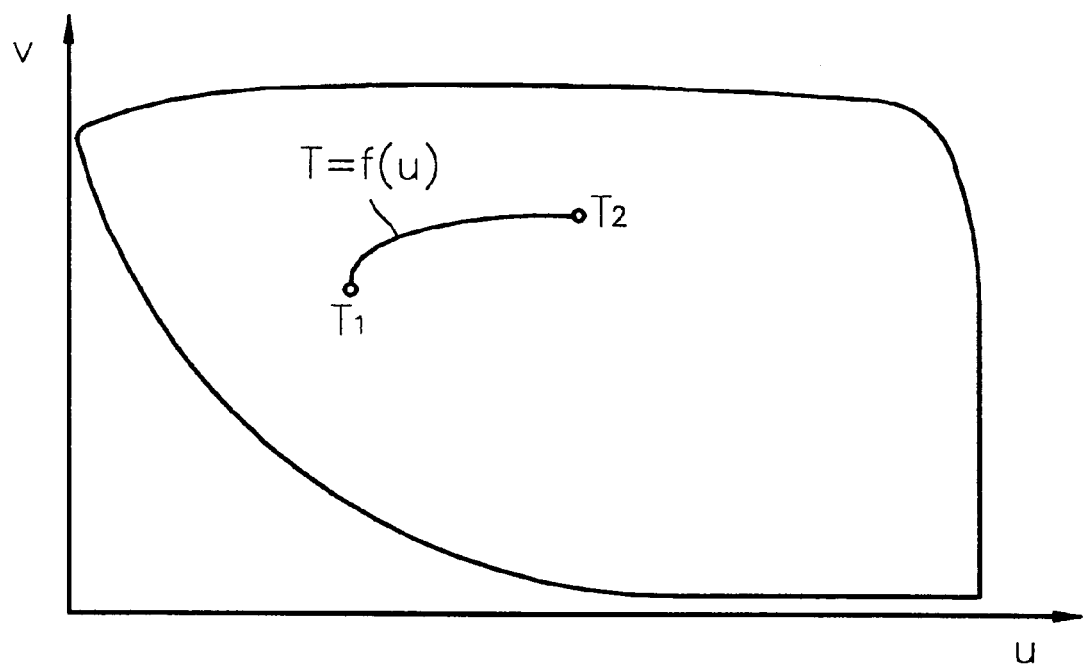
Figure 7:
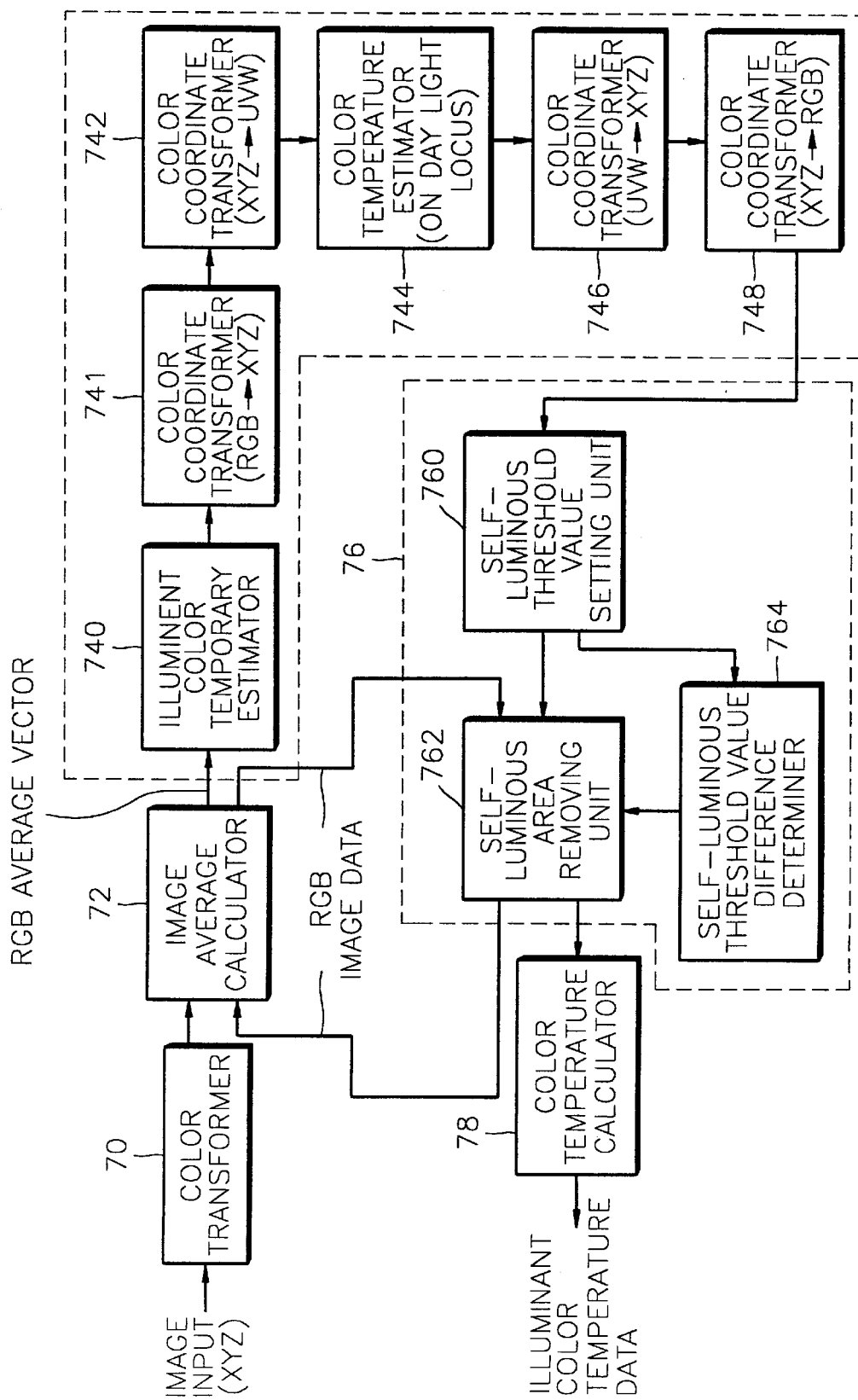

FIG. 4 describes the method of an experiment for obtaining a variable used for calculating a self luminous threshold value;

FIG. 5 is a flowchart showing the method for obtaining a variable used for calculating the self luminous threshold value;

FIG. 6 is a graph for describing the relationship between an uv coordinate value and a color on the daylight locus of the uv coordinate type in order to estimate the color of an illuminant; and FIG. 7 is a block diagram showing the structure of an apparatus for determining the color of an illuminant according to the present invention.

DESCRIPTION OF THE PREFERRED EMBODIMENTS

Hereinafter, preferred embodiments of a method for detecting the color of an illuminant according to the present invention and an apparatus therefor will be described in detail with reference to the attached drawings.

Figure 1B:
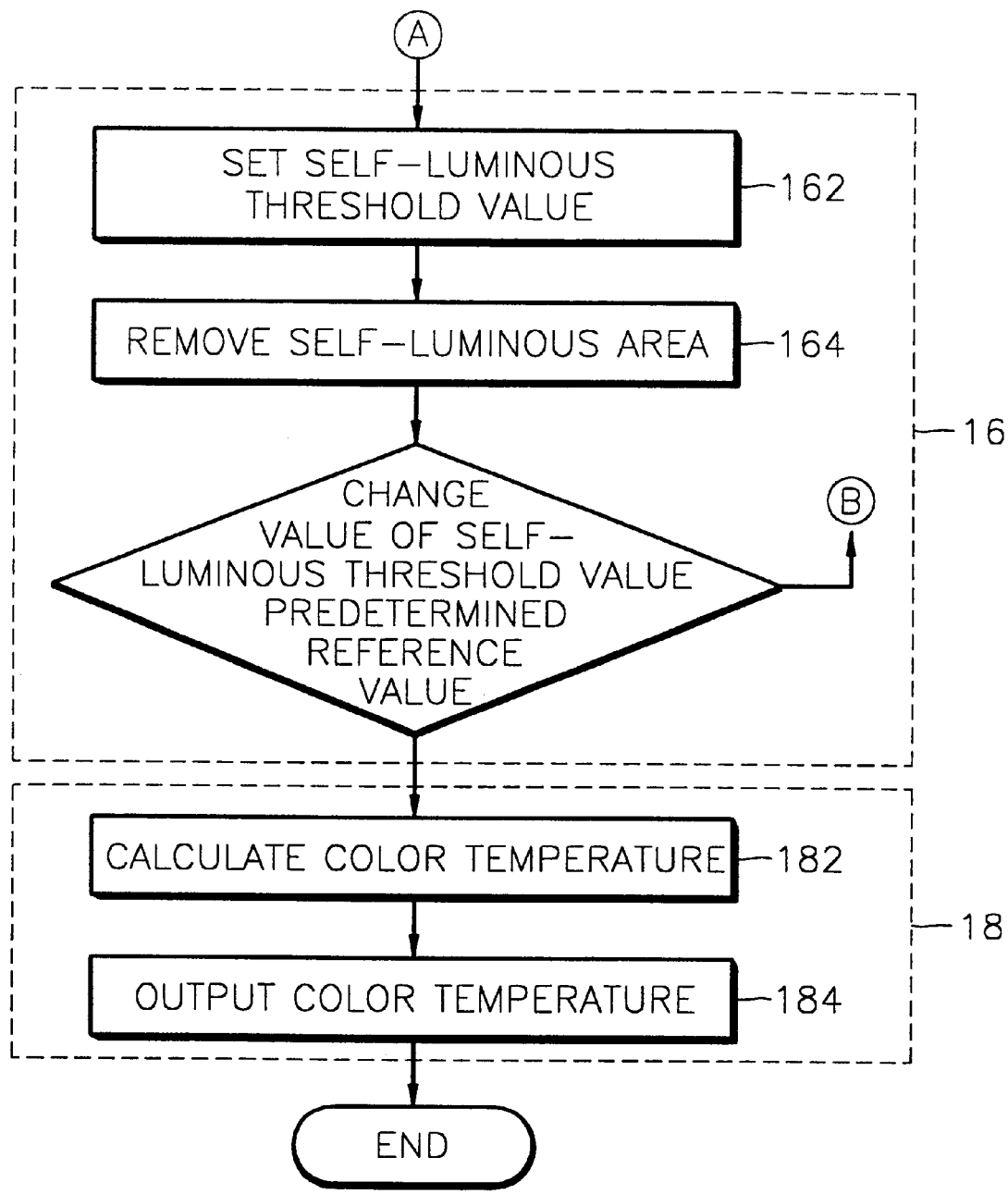
FIG. 1 is a flowchart showing main steps of a method for determining the color of an illuminant according to an embodiment of the present invention.

FIG. 1 is a flowchart showing the main steps of a method for determining the color of an illuminant according to an embodiment of the present invention. The method according to the present invention will be described with reference to FIG. 1. The portion for collecting an image in a color image input apparatus such as a digital camera or a scanner divides the image into R, G, and B components and inputs (step 10). In this embodiment, it is assumed that R, G, and B are used as an input image. However, other coordinates such as XYZ coordinates other than the RGB coordinates can be used. Then, according to the method of the present embodiment, an RGB average vector value is obtained by selecting an arbitrary image among RGB image data and calculating average values in the respective RGB channels with respect to the selected image (step 12).

Then, the color of the illuminant is estimated from the RGB average vector value (step 14). First, a predetermined coefficient f which is a positive integer larger than 1 is defined as a proportional value between the RGB average value of the RGB channels of the image and the color of the illuminant of a corresponding image and a value obtained by multiplying f by the RGB average vector value is temporarily assumed to be the color of the illuminant with respect to the image (step 142). The temporary illuminant color is transformed from the RGB coordinates into XYZ coordinates with respect to a monitor having 6500 K of color temperature, for example, and then the transformed illuminant color in XYZ coordinates is transformed into UVW coordinates. The color transformed into the UVW coordinates is normalized to the uv chrominance coordinate values (step 144). In the UVW coordinates, the distribution of the respective coordinates is known to be more uniform than the RGB and the XYZ coordinates according to human visual characteristics. Therefore, it is preferable that the color coordinate data is processed in the uniform coordinates such as the UVW coordinates. However, since the RGB coordinates are not directly transformed into the UVW coordinates, the RGB coordinates are transformed into the XYZ coordinates and then the XYZ coordinates are transformed into the UVW coordinates. Then, the uv chrominance coordinates closest to the uv chrominance coordinate value are normalized on the daylight locus (step 146).

Hereinafter, a method for obtaining the daylight locus will be described in detail so as to facilitate understanding of the present invention. Then, processes of selecting an estimated illuminant color on the daylight will be described.

Figure 2:
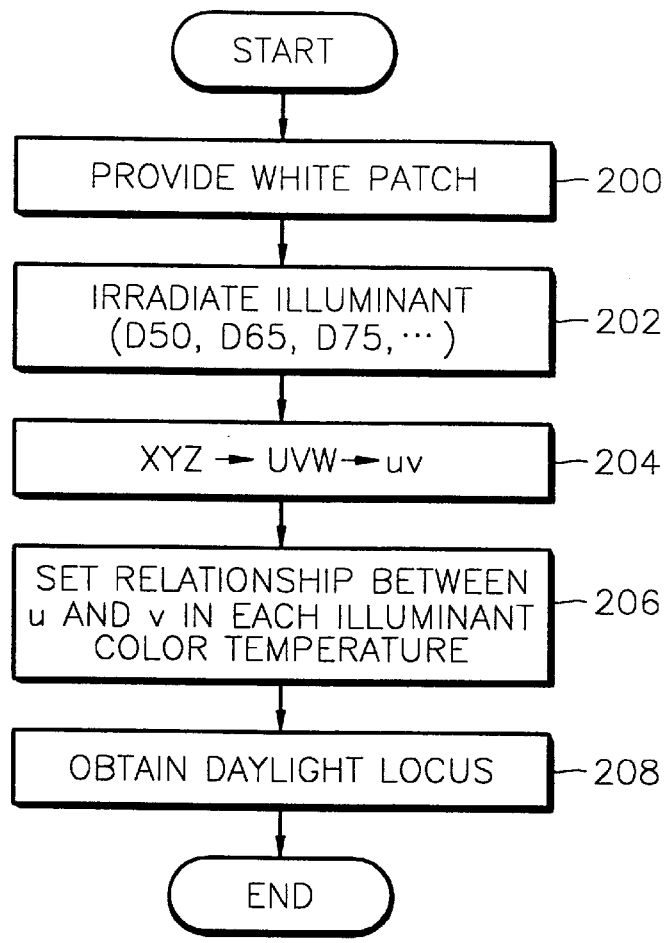
FIG. 2 is a flowchart showing main steps of a method for obtaining a daylight locus which can be used for the illuminant color determining method of FIG. 1.

FIG. 2 is a flowchart showing the main steps of a method for obtaining the daylight locus, which can be used for the illuminant color determining method of FIG. 1. Referring to FIG. 2, first, a white patch is prepared (step 200). Illuminations having various color are illuminated one by one (step 202). The XYZ value is obtained by measuring the light reflected from the patch using a measurer such as a spectro-photometer or a chrominance meter. The XYZ value is transformed into a UVW value. The UVW value is transformed into the uv value. Then, the daylight locus is obtained (step 208) by establishing the relationships between u and v for each illuminant color.

Figure 3:
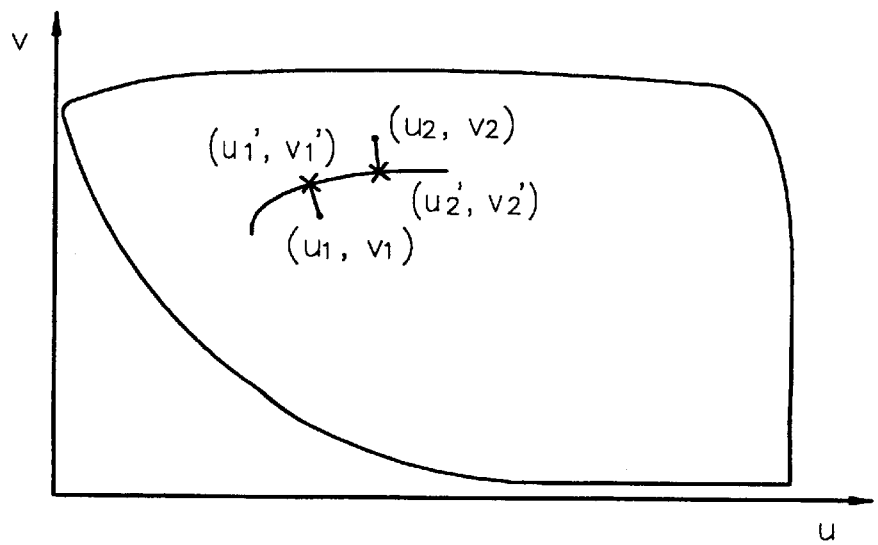
FIG. 3 is a graph showing an example of a result of performing a temporary estimation of the color of an illuminant in the daylight locus of an uv coordinate type.

FIG. 3 shows a graph of an example of a result of temporarily estimating the illuminant color on the daylight locus of the uv coordinate type. Referring to FIG. 3, $(u_1, v_1)$ and $(u_2, v_2)$ are assumed as points which are transformed temporarily estimated illuminant color onto uv chrominance coordinate. The points $(u_1', v_1')$ and $(u_2', v_2')$ which are closest to the previously calculated daylight locus are selected. The selected value is expressed as the uv chrominance coordinate value and is established as the estimated illuminant chrominance value.

Again, referring to FIG. 1, the estimated illuminant color expressed as the uv chrominance coordinate value is inverse transformed to the UVW coordinates. The estimated illuminant color inverse transformed to the UVW coordinates is inverse transformed to the XYZ coordinates. The estimated illuminant color inverse transformed to the XYZ coordinates is inverse transformed from the XYZ coordinates to the RGB coordinates with respect to an output apparatus having the predetermined color temperature (step 148).

Then, self luminous areas are removed from an image (step 16). The step Of removing the self luminous area will be described in detail as follows. First, when a predetermined coefficient which is a positive integer larger than 1 is called k in order to establish the self luminous area according to human visual characteristics, a value obtained by multiplying k by the estimated illuminant color inverse transformed to the RGB coordinates is set as the self luminous threshold value (step 162).

FIG. 4 describes a method for an experiment for obtaining a variable k used for calculating the self luminous threshold value. Referring to FIG. 4, in the experiment for obtaining the variable, an illuminant is illuminated on a monitor to which an RGB image signal is supplied through a window provided in a predetermined upper portion of a dark box. A color patch is attached on the monitor and a monitor screen is displayed in the center of the color patch. Alternatively, the central patch can be replaced each time when to the experimental condition changes without using the monitor.

FIG. 5 is a flowchart showing a method for obtaining a variable used for calculating the self luminous threshold value. Referring to FIG. 5, a plurality of color patches which can be usually used are prepared in order to obtain the variable used for calculating the self luminous threshold value (step 500). An illuminant which can be usually used is selected (step 502). A desired illuminant is illuminated through an illuminant window (step 504). An arbitrary patch is selected among a plurality of color patches (step 506). When an observer observes a corresponding patch through a hole of the dark box, it is determined whether the patch is not sensed as the surface of a subject but as an aperture or the illuminant (step 508). If the corresponding patch is not sensed as the illuminant, the RGB value of the corresponding patch is increased (step 510). If the corresponding patch is sensed as the illuminant, the RGB value of the corresponding patch is established to be an upper boundary. However, human eyes can sense a case in which it becomes brighter from a dark scene different from a case in which it becomes darker from a bright scene. Therefore, an experiment similar to the one described above is performed with respect to the case in which it becomes darker from a bright scene. First, the RGB value of a corresponding patch considered as the illuminant is slightly increased (step 520). A determination is made as to whether the corresponding patch is sensed as the illuminant (step 522). The RGB value of the corresponding patch is reduced until the corresponding patch is sensed as the illuminant (step 524). When the corresponding patch is sensed as the illuminant, the RGB value of the patch is established as a lower boundary. Finally, an average value between the upper boundary and the lower boundary is determined to be the variable k (step 560). The K times of estimated illuminant color which is inverse transformed to RGB coordinates can be set as the self luminous threshold value.

Again, referring to FIG. 1, from the selected image, self-luminous areas having RGB value exceeds self-luminous threshold value are removed, so that the image removed self-luminous areas are generated (step 164).

Finally, the color of the illuminant corresponding to the uv chrominance value of the image from which the self luminous areas are removed is calculated on the daylight locus (step 182). FIG. 6 shows a graph describing the relationship between the uv coordinate value and the color in the daylight locus of the uv coordinate type in order to estimate the color of the illuminant. Referring to FIG. 6, when the u or v value is known, it is possible to obtain a color corresponding thereto. Namely, the color temperature T can be represented as follows.

$$T=f(U) \text{ or } T=f(v) \tag{1}$$

Accordingly, the color of the illuminant color temperature is obtained (step 184).

Evaluated data for estimating an illuminant according to the above method are shown in Table. 1. In the experiment, six sheets of image obtained by photographing subject sets having the same structures with respect to a standard illuminant schematically including illuminant components which are typically used such as horizon (HRZ), incandescent (INC), cool white (CLW), daylight 5,000 K (D50), daylight 6,000 K (D60), daylight 6,500 K (D65), and daylight 7,500 K (D75). Also, the XYZ value is measured from the white surface to which standard light is irradiated and an XYZ-RGB transformation performed with respect to a corresponding illuminant. And then, an RGB value obtained by normalizing the RGB value is used as an illuminant reference.

[TABLE 1]

| type of illuminant | measured XYZ of illuminant (from spectrum) | | | color of illuminant (k) | estimated color (K) | reference white RGB | calculated illuminant average RGB | mean error (%) |
| --- | --- | --- | --- | --- | --- | --- | --- | --- |
| | X | Y | Z | | | | | |
| HRZ | 1.2007 | 1.0 | 0.2026 | 2129 | 1600 | (1.0715, 1.0, 0.6126) | (1.1249, 1.0, 0.6894) | 9.35 |
| INC | 1.1122 | 1.0 | 0.3150 | 2624 | 2200 | (1.9817, 1.0, 0.5764) | (1.0477, 1.0, 0.6289) | 8.43 |
| CLW | 1.0275 | 1.0 | 0.5731 | 3531 | 3100 | (0.8077, 1.0, 0.5414) | (0.8461, 1.0, 0.5570) | 4.15 |
| D50 | 0.9770 | 1.0 | 0.7976 | 4698 | 4900 | (0.7974, 1.0, 0.5697) | (0.8633, 1.0, 0.6078) | 7.61 |
| D65 | 0.9518 | 1.0 | 1.0442 | 6193 | 6100 | (0.7466, 1.0, 0.5831) | (0.8059, 1.0, 0.6171) | 6.84 |
| D75 | 0.9462 | 1.0 | 1.1892 | 7344 | 6900 | (0.7307, 1.0, 0.5971) | (0.7835, 1.0, 0.6234) | 5.89 |

Referring to FIG. 1, the illuminant estimation performance by a method according to the present invention has an error of about 4 to 9% when the distance between a vector obtained by estimating the RGB value of the illuminant and the illuminant reference. Also, the difference between the color temperature of the illuminant obtained by actual measurement and the estimated color is less than 500 K, which is a small amount.

FIG. 7 is a block diagram showing the structure of an apparatus for determining the color of an illuminant. Referring to FIG. 7, the apparatus for determining the color of an illuminant according to the present invention includes a color transformer 70, an image average calculator 72, an illuminant color estimator 74, a self-luminous area removing portion 76, and a color temperature calculator 78. The illuminant color estimator 74 includes a temporary illuminant color estimator 740, a color coordinate transformer 741, a color coordinate transformer 742, a color estimator 744, a color coordinate transformer 746, and a color coordinate transformer 748. The light luminous area remover 76 includes a self luminous threshold value setting unit 760, a self luminous area remover 762, and a self luminous threshold value difference determiner 764.

An image based on the XYZ coordinates is input to the apparatus. A color transformer 70 receives image data of the XYZ coordinates and performs a color transformation into RGB already having measured white information which is known from measurement. The color transformer 70 corrects the input image according to the characteristic of an output chrominance of a corresponding monitor. The above-mentioned characteristic correction is simultaneously performed. In the present embodiment, a monitor having a color of D65 (corresponding to day light of 6,500 K) will be described as an example. The relationship between the RGB and the XYZ can be represented as follows with respect to the monitor having a color of D65 (corresponding to day light of 6,500 K) through experiments.

$$\begin{bmatrix} R \\ G \\ B \end{bmatrix} = \begin{bmatrix} 2.219 & -1.098 & -0.349 \\ -1.303 & 2.376 & 0.051 \\ 0.084 & -0.278 & 1.298 \end{bmatrix} \begin{bmatrix} X \\ Y \\ Z \end{bmatrix} \quad (2)$$

When a scale factor for correcting white in each channel is w and a correction coefficient for linearizing the characteristic of the monitor is y, the color transformer 70 estimates the RGB value of each channel as follows $$R^\theta = W_R R^Y$$
$$G^\theta = W_G G^Y$$
$$B^\theta = W_B B^Y$$

The experimental value of the scale factor w is (0.2078, 0.3924, 0.3998). The gamma value γ can be measured by experiment. It is possible to use 2.2 which is often used as the gamma value. The color transformer 70 outputs the RGB image data by performing the characteristic correction with respect to a monitor having a color of D65 with respect to the XYZ image and a color transformation from XYZ to RGB.

The image average calculator 72 calculates entire average values in the respective RGB channels with respect to the RGB image data output from the color transformer 70.

$$aR = \frac{1}{(r*c)} \sum_{i=0}^{r} \sum_{j=0}^{c} R(i, j) \quad (4)$$

$$aG = \frac{1}{(r*c)} \sum_{i=0}^{r} \sum_{j=0}^{c} G(i, j)$$

-continued $$aB = \frac{1}{(r*c)} \sum_{i=0}^{r} \sum_{j=0}^{c} B(i, j)$$

A mean vector aRGB is obtained from aR, aG, and aB and is output.

The illuminant color estimator 74 estimates the color of the illuminant from aRGB. The operation in the illuminant color estimator 74 will be described in detail as follows. The temporary illuminant color estimator 740 defines a predetermined coefficient f between the mean value of an image chrominance and the illuminant chrominance of a corresponding image as a proportional value. Namely, the temporarily estimated value of the color of a corresponding image is defined as a value obtained by multiplying f by the mean value of the image chrominance (f×aRGB). As an example, when a neutral gray which is the chrominance corresponding to a color between black and white is established as an average value, f becomes 2.0.

The color coordinate transformers 741 and 742 receive the estimated illuminant color vector of the image and transforms the illuminant color vector so as to correspond to the UVW coordinates. In the present embodiment, the UVW coordinates are used as the transformation coordinates. It is possible to use coordinates having better linearity than other coordinates compared with the human visual characteristics, for example, YUV or LUV coordinates, as known to those skilled in the art. Also, the color coordinate transformer 742 transforms the illuminant color vector transformed into the UVW coordinates into the uv chrominance value. Such a transformation process can be understood by a normalizing calculation with respect to the UVW vector coordinates as known to those skilled in the art.

The color temperature estimator 744 receives a normalized uv chrominance vector and selects the value closest to the previously calculated day light locus as the estimated color temperature value with reference to FIG. 3. Then, the color estimator 744 outputs the illuminant color vector corresponding to the selected estimated color temperature value as the estimated color of the illuminant. Namely, the estimated illuminant color vector corresponds to the uv coordinate value.

The color coordinate transformer 746 receives the uv chrominance vector, transforms the uv chrominance vector into the UVW illuminant color vector, and transforms the UVW illuminant color vector into the XYZ illuminant color vector. The color coordinate transformer 748 transforms the XYZ illuminant color vector into the RGB illuminant color vector.

The self-luminous area removing unit 76 removes the self-luminous area. At this time, the RGB illuminant color vector is used. The operation in the self-luminous area removing unit 76 will be described in detail as follows. The self luminous threshold value setting unit 760 set a value obtained by multiplying k which is a predetermined coefficient obtained as mentioned above with reference to FIG. 5 by the temporarily estimated color value (f×aRGB) close to the day light locus as the self luminous threshold value. The self luminous area removing unit 762 removes pixels exceeding the self-luminous threshold value, i.e., the self-luminous area from the entire image. The self luminous threshold value change determining unit 764 compares a self luminous threshold value change value which is the difference between a previous self luminous threshold value and a newly calculated self luminous threshold value with a predetermined reference value close to 0, outputs a "high"

signal as a control signal when the change value exceeds the reference value, and outputs a "low" signal as a control signal when the change value does not exceed the reference value. The self luminous are a removing unit 762 terminates a self luminous area removing operation when the control signal which is "low" is input. The self luminous area removing unit 762 outputs the image from which the self luminous area is removed to the image average calculator 72 and repeats previous operations when the control signal which is "high" is input.

The color calculator 78 outputs the color corresponding to the uv chrominance value (corresponding to a final RGB mean vector value) of the image from which the estimated self luminous area is removed on the day light locus as the illuminant color as mentioned above with reference to FIG. 6.

The apparatus for determining the color of an illuminant according to the present invention makes the human visual characteristic coefficient, defines a threshold value having a predetermined value with respect to the self luminous area according to the coefficient, and compares the threshold value with the image. The apparatus can be comprised of a memory for storing the coefficient, an operation apparatus for calculating a threshold value, and a comparator for comparing the threshold value with the image. Namely, it is possible to easily realize hardware using the apparatus for determining the color of an illuminant according to the present invention. Also, an additional optical sensor for detecting the illuminant color and additional buttons for compensating for the illuminant components are not necessary.

In the embodiment of the present invention, the transformation is performed using the RGB, the XYZ, and the UVW coordinates. However, other appropriate coordinates can be used according to the purpose and the characteristics of a camera or a camcorder as known to those skilled in the art. Therefore, the above-mentioned embodiments do not restrict the scope of the present invention defined by the attached claims.

As mentioned above, according to the method for determining the color of an illuminant according to the present invention and the apparatus therefor, it is possible to stably and effectively extract information of the illuminant by selectively excluding the self luminous area from the visually sensed image. Also, since an apparatus using by the above method can be simply realized, hardware can be easily used.

What is claimed is:

1. A method for detecting the color of an illuminant during photography of a color image having arbitrary standard color coordinates which can be transformed, comprising the steps of:

obtaining a mean vector value by selecting an arbitrary image and calculating an average value in each color coordinate channel with respect to the image;

defining a predetermined coefficient f which is a positive integer larger than 1 and estimating a value obtained by multiplying f by the mean vector value as a temporary color of the illuminant with respect to the selected image;

setting a value obtained by multiplying k by the temporarily estimated color of the illuminant as a self luminous threshold value in order to establish a self luminous area using human visual characteristics, wherein k is a predetermined coefficient which is a positive integer larger than 1;

generating an image from which the self luminous area is removed by removing the self luminous area having a color coordinate value exceeding a self luminous threshold value;

determining whether the difference value of the self luminous threshold value exceeds a predetermined reference value and returning to the step of calculating the mean vector value when the difference value is determined to exceed a predetermined reference value; and calculating the color of the illuminant from a chrominance value of an image average from which the self luminous area is removed and outputting the color of the illuminant when it is determined that the difference value does not exceed a predetermined reference value in the step of determining the difference value step.

2. The method of claim 1, wherein the coefficient k is determined by the steps of:

providing a plurality of color patches;

selecting an illuminant which can be used in an image;

illuminating the selected illuminant on the plurality of color patches;

selecting an arbitrary patch among the plurality of color patches;

increasing the RGB value of a corresponding packet until the selected patch looks like an illuminant;

establishing the RGB value when the corresponding patch looks like the illuminant as an upper boundary;

increasing the RGB value of the patch by a predetermined amount;

reducing the RGB value of a corresponding packet until the selected patch looks like the illuminant;

establishing the RGB value when the corresponding patch looks like the illuminant as a lower boundary; and determining a mean value between the upper boundary and the lower boundary as the variable k with respect to the selected illuminant.

3. The method of claim 1, further comprising a step of estimating illuminant color closest to the temporarily estimated illuminant color on a day light locus as the illuminant color before the step of setting the self luminous threshold value.

4. A method for detecting the color temperature of an illuminant during photography of an arbitrary color image, comprising the steps of:

obtaining an RGB mean vector value by selecting an arbitrary image and calculating a mean value in each RGB channel with respect to the image;

defining a predetermined coefficient f which is a positive integer larger than 1 and estimating a value obtained by multiplying f by the RGB mean vector value as temporary color of the illuminant with respect to the selected image;

setting a value obtained by multiplying k by the estimated color of the illuminant as a self luminous threshold value in order to establish a self luminous area using a human visual characteristic wherein k is a predetermined coefficient which is a positive integer larger than 1;

generating an image from which the self luminous threshold value is removed by removing the self luminous area having the RGB value exceeding the self luminous threshold value;

determining whether the difference value of the self luminous threshold value exceeds a predetermined reference value close to 0 and returning to the step of calculating the RGB mean vector value when the difference value is determined to exceed a predetermined reference value; and calculating the color of the illuminant from the chrominance value of the image average from which the self luminous are is removed and outputting the color of the illuminant when the difference value is determined not to exceed a predetermined reference value in the step of determining the difference value.

5. The method of claim 4, further comprising the step of estimating an illuminant color closest to the temporarily estimated illuminant color on the day light locus as the illuminant color before the step of setting the self luminous threshold value.

6. The method of claim 4, further comprising the step of performing a color transformation into the RGB having white of a corresponding color temperature with respect to an output apparatus having a prespecified color temperature and correcting the characteristic of the output apparatus at the same time.

7. The method of claim 4, wherein the coefficient k is determined by the steps of:

providing a plurality of color patches;

selecting an illuminant which can be used in an image;

irradiating the selected illuminant to the plurality of color patches;

selecting an arbitrary patch among the plurality of color patches;

increasing the RGB value of a corresponding packet until the selected patch looks like the illuminant;

establish the RGB value when the corresponding patch looks like the illuminant as an upper boundary;

increasing the RGB value of the patch by a predetermined amount;

reducing the RGB value of the corresponding packet until the selected patch looks like the illuminant;

establishing the RGB value when the corresponding patch looks like the illuminant as a lower boundary; and determining the mean value between the upper boundary and the lower boundary as the variable k with reference to the selected illuminant.

8. A method for detecting the color temperature of an illuminant during photography of an arbitrary color image, comprising the steps of:

obtaining an RGB mean vector value by selecting an arbitrary image and calculating a mean value in each RGB channel with respect to the image;

defining a predetermined coefficient f which is a positive integer larger than 1 and estimating a value obtained by multiplying f by an RGB mean vector value as temporary illuminant color with respect to a selected image;

transforming the temporary illuminant color from RGB coordinates into XYZ coordinates with respect to an output apparatus having a predetermined color temperature;

transforming the illuminant color transformed into the XYZ coordinates into the UVW coordinates;

normalizing the illuminant color transformed into the UVW coordinates to the uv chrominance coordinate value;

selecting the uv chrominance coordinate value closest to the normalized on the day light locus as an estimated illuminant color, inverse transforming the estimated illuminant color expressed as the uv chrominance coordinate value to the UVW coordinates;

inverse transforming the estimated illuminant color inverse transformed to the UVW coordinates to the XYZ coordinates;

inverse transforming the estimated illuminant color inverse transformed to the XYZ coordinate from the XYZ coordinates to the RGB coordinates with respect to an output apparatus having the predetermined color;

setting a value obtained by multiplying k by the estimated illuminant color inverse transformed to the RGB coordinates in order to establish a self luminous area according to a human visual characteristics wherein k is a predetermined coefficient which is a positive integer larger than 1;

generating an image from which the self luminous area is removed by removing the self luminous area having an RGB value exceeding the self luminous threshold value from the selected area;

determining whether the difference value of the self luminous threshold value exceeds a predetermined reference value close to 0 and returning to the step of calculating the RGB mean vector value when the difference value exceeds a predetermined reference value; and calculating the illuminant value corresponding to the uv chrominance value of the image from which the self luminous area is removed on the day light locus and outputting the illuminant color value when the difference value is determined not to exceed a predetermined reference value in the step of determining the difference value.

9. The method of claim 8, wherein the coefficient k is determined by the steps of:

providing a plurality of color patches;

selecting an illuminant which can be used in an image;

irradiating the selected illuminant to the plurality of color patches;

selecting an arbitrary patch among the plurality of color patches;

increasing the RGB value of a corresponding packet until the selected patch looks like the illuminant;

establishing the RGB value when the corresponding patch looks like the illuminant as an upper boundary;

increasing the RGB value of the patch by a predetermined amount;

reducing the RGB value of the corresponding packet until the selected patch looks like the illuminant;

establishing the RGB value when the corresponding patch looks like the illuminant as a lower boundary; and determining the mean value between the upper boundary and the lower boundary as the variable k with reference to the selected illuminant.

10. An apparatus for detecting the color of an illuminant during photography of a color image having arbitrary standard color coordinates which can be transformed, comprising:

an image average calculating portion for outputting a mean vector value by selecting an arbitrary image and calculating a mean value in each color coordinate channel;

an illuminant color temporarily estimating portion for defining a predetermined coefficient f which is a positive integer larger than 1 and outputting a value obtained by multiplying f by the mean vector value as a temporarily estimated illuminant color with respect to the selected image;

a self luminous threshold value setting portion for setting a value obtained by multiplying k by the temporarily estimated illuminant color as a self luminous threshold value in order to establish a self luminous area using a human visual characteristics wherein k is a predetermined coefficient which is a positive integer larger than 1;

a self luminous area removing portion for generating an image from which the self luminous area is removed by removing the self luminous area having a color coordinate value exceeding the self luminous threshold value; and a color temperature calculating portion for calculating the illuminant color value from the chrominance value of the image average from which the self luminous area is removed.

11. The apparatus of claim 10, wherein the coefficient k is determined by the steps of:

including a plurality of color patches;

selecting an illuminant which can be used in an image;

illuminating the selected illuminant on the plurality of color patches;

selecting an arbitrary patch among the plurality of color patches;

increasing the RGB value of a corresponding packet until the selected patch looks like the illuminant;

establishing the RGB value when the corresponding patch looks like the illuminant as an upper boundary;

increasing the RGB value of the patch by a predetermined amount;

reducing the RGB value of the corresponding packet until the selected patch looks like the illuminant;

establishing the RGB value when the corresponding patch looks like the illuminant as a lower boundary; and determining the mean value between the upper boundary and the lower boundary as the variable k with reference to the selected illuminant.

12. The apparatus of claim 10, wherein the illuminant color temporarily estimating portion further comprises means for estimating the illuminant color closest to the temporarily estimates illuminant color on the day light locus as an illuminant color.

13. An apparatus for determining the color of an illuminant during photography of an arbitrary color image, comprising:

an image mean calculating portion for outputting an RGB mean vector value by selecting an arbitrary image and calculating a mean value in each RGB channel with respect to the image;

an illuminant color temporarily estimating portion for defining a predetermined coefficient f which is a positive integer larger than 1 and estimating a value obtained by multiplying f by the RGB mean vector value as a temporary illuminant color with respect to the selected image;

a color temperature estimating portion for estimating the illuminant color closest to the temporarily estimated illuminant color temperature on the day light locus as an illuminant color temperature;

a self luminous threshold value setting portion for setting a value obtained by multiplying k by the estimated illuminant color as the self luminous threshold value when a predetermined coefficient which is a positive integer larger than 1 is called k in order to establish a self luminous area using human visual characteristics;

a self luminous area removing portion for generating an image from which a self luminous are is removed by removing the self luminous area having an RGB value exceeding the self luminous threshold value; and a color temperature calculating portion for calculating the color of an illuminant from the uv chrominance value of the image from which the self luminous area is removed and outputting the illuminant color.

14. The apparatus of claim 13, further comprising a self luminous threshold value difference determining portion for comparing a self luminous threshold value change value which is a difference between a previous self luminous threshold value and a newly calculated self luminous threshold value with a predetermined reference value close to 0 and outputting a control signal having a first logic value when the difference value exceeds the reference value and a second logic value when the difference value does not exceed the reference value, wherein the self luminous area removing portion terminates an operation of removing the self luminous area and outputs the uv chrominance value for calculating the color temperature in response to the control signal having the first logic value or outputs the image from which the self luminous area is removed to the image average calculating portion in response to the control signal having a second logic value.

15. The apparatus of claim 13, further comprising means for transforming a color transformation into RGB having white color of a corresponding color with respect to an output apparatus having a prespecified color temperature and correcting the characteristic of the output apparatus at the same time.

16. The apparatus of claim 13, wherein the coefficient k is determined by the steps of:

providing a plurality of color patches;

selecting an illuminant which can be used in an image;

irradiating the selected illuminant to the plurality of color patches;

selecting an arbitrary patch among the plurality of color patches;

increasing the RGB value of a corresponding packet until the selected patch looks like the illuminant;

establishing the RGB value when the corresponding patch looks like the illuminant as an upper boundary;

increasing the RGB value of the patch by a predetermined amount;

reducing the RGB value of the corresponding packet until the selected patch looks like the illuminant;

establishing the RGB value when the corresponding patch looks like the illuminant as a lower boundary; and determining the mean value between the upper boundary and the lower boundary as the variable k with reference to the selected illuminant.

17. An apparatus for detecting an illuminant color temperature for detecting an illuminant temperature during photographing from an arbitrary color image, comprising:

means for obtaining an RGB mean vector value by selecting an arbitrary image and calculating a mean value in each RGB channel with respect to the image;

means for defining a predetermined coefficient f which is a positive integer larger than 1 and estimating a value obtained by multiplying f by an RGB mean vector value as a temporary illuminant color with respect to a selected image;

means for transforming the temporary illuminant color from RGB coordinates into XYZ coordinates with respect to an output apparatus having a predetermined color temperature;

means for transforming the illuminant color transformed into the XYZ coordinates into the UVW coordinates;

means for normalizing the illuminant color transformed into the UVW coordinates to the uv chrominance coordinate value;

means for selecting the uv chrominance coordinate value closest to the normalized on the day light locus as an estimated illuminant color;

means for inverse transforming the estimated illuminant color expressed as the uv chrominance coordinate value to the UVW coordinates;

means for inverse transforming the estimated illuminant color inverse transformed to the UVW coordinates to the XYZ coordinates;

means for inverse transforming the estimated illuminant color inverse transformed to the XYZ coordinate from the XYZ coordinates to the RGB coordinates with respect to an output apparatus having the predetermined color;

means for setting a value obtained by multiplying k by the estimated illuminant color inverse transformed to the RGB coordinates in order to establish a self luminous area according to human visual characteristics wherein k is a predetermined coefficient which is a positive integer larger than 1;

means for generating an image from which the self luminous area is removed by removing the self luminous area having the RGB value exceeding the self luminous threshold value from the selected area; and means for calculating an illuminant color temperature corresponding the uv chrominance value of the image from which the self luminous area is removed on the day light locus and outputting the illuminant color temperature.

18. The apparatus of claim 17, wherein the coefficient k is determined by the steps of:

providing a plurality of color patches;

selecting an illuminant which can be used in an image;

illuminating the selected illuminant on the plurality of color patches;

selecting an arbitrary patch among the plurality of color patches;

increasing the RGB value of a corresponding packet until the selected patch looks like the illuminant;

establishing the RGB value when the corresponding patch looks like the illuminant as an upper boundary;

increasing the RGB value of the patch by a predetermined amount;

reducing the RGB value of the corresponding packet until the selected patch looks like the illuminant;

establishing the RGB value when the corresponding patch looks like the illuminant as a lower boundary; and determining the mean value between the upper boundary and the lower boundary as the variable k with reference to the selected illuminant.

19. The apparatus of claim 17, further comprising a self luminous threshold value difference determining portion for comparing a self luminous threshold value change value which is a difference between a previous self luminous threshold value and a newly calculated self luminous threshold value with a predetermined reference value close to 0 and outputting a control signal having a first logic value when the change value exceeds the reference value and a second logic value when the change value does not exceed the reference value, wherein the self luminous area removing portion terminates an operation of removing the self luminous area and outputs the uv chrominance value for calculating the color temperature in response to the control signal having the first logic value or outputs the image from which the self luminous area is removed to the image average calculating portion in response to the control signal having a second logic value.

* * * * *